United States Patent
Dobek et al.

(10) Patent No.: US 9,222,439 B2
(45) Date of Patent: Dec. 29, 2015

(54) ROCKET ENGINE WITH CRYOGENIC PROPELLANTS

(75) Inventors: Olivier Dobek, Saint Cyr l'Ecole (FR); Daniel Le Dortz, Vernon (FR)

(73) Assignee: SNECMA, Paris (FR)

( * ) Notice: Subject to any disclaimer, the term of this patent is extended or adjusted under 35 U.S.C. 154(b) by 581 days.

(21) Appl. No.: 13/384,477

(22) PCT Filed: Jul. 16, 2010

(86) PCT No.: PCT/FR2010/051504
§ 371 (c)(1),
(2), (4) Date: Feb. 2, 2012

(87) PCT Pub. No.: WO2011/007108
PCT Pub. Date: Jan. 20, 2011

(65) Prior Publication Data
US 2012/0131903 A1    May 31, 2012

(30) Foreign Application Priority Data

Jul. 17, 2009  (FR) ...................................... 09 54984

(51) Int. Cl.
*F02K 9/50*    (2006.01)
*F02K 9/97*    (2006.01)
*F02K 9/64*    (2006.01)

(52) U.S. Cl.
CPC . *F02K 9/972* (2013.01); *F02K 9/50* (2013.01); *F02K 9/64* (2013.01)

(58) Field of Classification Search
CPC ............... F02K 9/64; F02K 9/48; F02K 9/50; F02K 9/972; F02K 9/58; F02K 9/44; F02K 3/115; Y10S 60/915

USPC ............................ 60/257–260, 266, 267, 915
See application file for complete search history.

(56) References Cited

U.S. PATENT DOCUMENTS

| | | | | |
|---|---|---|---|---|
| 2,663,142 A * | 12/1953 | Wilson | ............................ | 60/267 |
| 2,991,617 A * | 7/1961 | Nerad et al. | .................... | 60/257 |
| 3,220,180 A | 11/1965 | Heckert | | |
| 3,246,466 A * | 4/1966 | Masters | ......................... | 60/258 |
| 3,354,652 A * | 11/1967 | Novotny et al. | ............... | 60/260 |
| 3,416,600 A * | 12/1968 | Fink | ............................. | 165/175 |
| 3,543,845 A * | 12/1970 | Pfouts et al. | .................... | 60/267 |

(Continued)

FOREIGN PATENT DOCUMENTS

FR    2 782 378    2/2000

OTHER PUBLICATIONS

International Search Report Issued Oct. 27, 2010 in PCT/FR10/51504 Filed Jul. 16, 2010.

*Primary Examiner* — Ted Kim
(74) *Attorney, Agent, or Firm* — Oblon, McClelland, Maier & Neustadt, L.L.P.

(57) ABSTRACT

A cryogenic-propellant rocket engine includes: at least a first tank for a first liquid propellant; a second tank for a second liquid propellant; a third tank for an inert fluid; an axisymmetrical nozzle including a combustion chamber, a device for injecting first and second liquid propellants into the combustion chamber, a nozzle throat, and a divergent section; and a heater device including at least one duct for conveying the inert fluid and arranged outside the nozzle in immediate proximity thereof, but without making contact therewith, to recover energy of thermal radiation emitted when the rocket engine is in operation and to heat the inert fluid.

11 Claims, 2 Drawing Sheets

(56) References Cited

U.S. PATENT DOCUMENTS

| | | | | |
|---|---|---|---|---|
| 3,630,449 A | * | 12/1971 | Butler | 239/127.1 |
| 4,785,879 A | * | 11/1988 | Longsworth et al. | 165/164 |
| 4,825,647 A | * | 5/1989 | Cann | 60/203.1 |
| 5,048,289 A | * | 9/1991 | Brown | 60/267 |
| 5,802,842 A | * | 9/1998 | Hook et al. | 60/257 |
| 6,482,485 B1 | | 11/2002 | Pichon | |
| 6,658,863 B2 | | 12/2003 | Beck et al. | |
| 7,900,436 B2 | * | 3/2011 | Greene | 60/257 |
| 2003/0052154 A1 | * | 3/2003 | Marshall et al. | 228/122.1 |
| 2007/0104935 A1 | * | 5/2007 | Schofalvi et al. | 428/292.1 |
| 2009/0218037 A1 | * | 9/2009 | Caro et al. | 156/143 |
| 2010/0205933 A1 | * | 8/2010 | Mungas et al. | 60/267 |
| 2010/0218482 A1 | * | 9/2010 | Greason et al. | 60/260 |

\* cited by examiner

ROCKET ENGINE WITH CRYOGENIC PROPELLANTS

FIELD OF THE INVENTION

The present invention relates to a cryogenic-propellant rocket engine having at least a first tank for a first liquid propellant, a second tank for a second liquid propellant, a third tank for an inert fluid, and an axisymmetrical nozzle comprising a combustion chamber, a device for injecting first and second liquid propellants into the combustion chamber, a nozzle throat, and a divergent section.

PRIOR ART

Patent document U.S. Pat. No. 6,658,863 describes in particular a system for storing and supplying inert gas such as helium under pressure on board a rocket-engine launcher vehicle for the purpose of pressurizing one or more propellant tanks in order to deliver the propellant continuously to the rocket engine and in order to maintain the structural integrity of the tank. Such a known system implements a heat exchanger that may make use of the hot gases from the propulsion system of the launcher as a source of heat. As an alternative, proposals are also made for using electrical heating. Such solutions are not appropriate for all types of rocket engine and divergent nozzle, and in particular they are poorly adapted to recovering energy from rocket engines operating in an expander type cycle or using divergent nozzles made of composite material.

In general, use is often made in industry of heat exchangers that heat a fluid by making use of the power available from a solid part, which power is recovered either by conduction (contact between two parts) or else by convection (contact between a hot fluid and a wall).

OBJECT AND DEFINITION OF THE INVENTION

The invention seeks to remedy the above-mentioned drawbacks of the prior art and to make it possible in optimized and simple manner to recover the heat available from a rocket engine for the purpose of heating an inert fluid for pressurizing one or more propellant tanks, and also to reduce the on-board weight in the launcher fitted with the rocket engine.

In accordance with the invention, these objects are achieved by a cyrogenic-propellant rocket engine having at least a first tank for a first liquid propellant, a second tank for a second liquid propellant, a third tank for an inert fluid, and an axisymmetrical nozzle comprising a combustion chamber, a device for injecting first and second liquid propellants into the combustion chamber, a nozzle throat, and a divergent section, the rocket engine being characterized in that it further comprises a heater device including at least one duct for conveying said inert fluid and arranged outside the nozzle in the immediate proximity thereof, but without making contact therewith, in order to recover the energy of the thermal radiation emitted when the rocket engine is in operation and in order to heat said inert fluid, the heater device comprising a plate in the form of a frustoconical sector that extends around the divergent section of the nozzle over an angle σ lying in the range 30° to 360°.

The radiant power emitted by a rocket-engine divergent nozzle section made of composite material may be greater than 250 kilowatts per square meter ($kW/m^2$) of the divergent section, and it is thus possible to recover a large amount of radiant energy for heating the inert fluid (e.g. helium available at 20 kelvins (K)), thereby pressurizing a launcher stage so as to obtain a direct increase in terms of payload (of the order of several tens of kilograms), without necessarily recovering energy from the rocket engine by conduction or convection.

According to an aspect of the invention, the heater device comprises a metal structure in which the inert fluid for heating flows and a fine layer that is strongly absorbent from a thermal radiation point of view is deposited at least on the walls that face the nozzle constituting a radiant power source.

The plate of the heater device may present thickness lying in the range about 5 millimeters (mm) to 15 mm.

The plate of the heater device may advantageously include a network of continuous channels of rectangular or circular section.

The inert fluid is advantageously helium that may serve as a pressurization gas, e.g. for pressurizing a liquid oxygen tank. Under such circumstances, connection pipes are arranged between the heater device and the liquid oxygen tank in order to supply it with pressurizing helium.

The nozzle of the rocket engine may be made in a wide variety of manners, and may, for example, include an expandable divergent nozzle that may advantageously be made of carbon-carbon composite material.

BRIEF DESCRIPTION OF THE DRAWINGS

Other characteristics and advantages of the invention appear from the following description of particular embodiments given as examples and with reference to the accompanying drawings, in which.

DETAILED DESCRIPTION OF PREFERRED EMBODIMENTS

Figure 4:
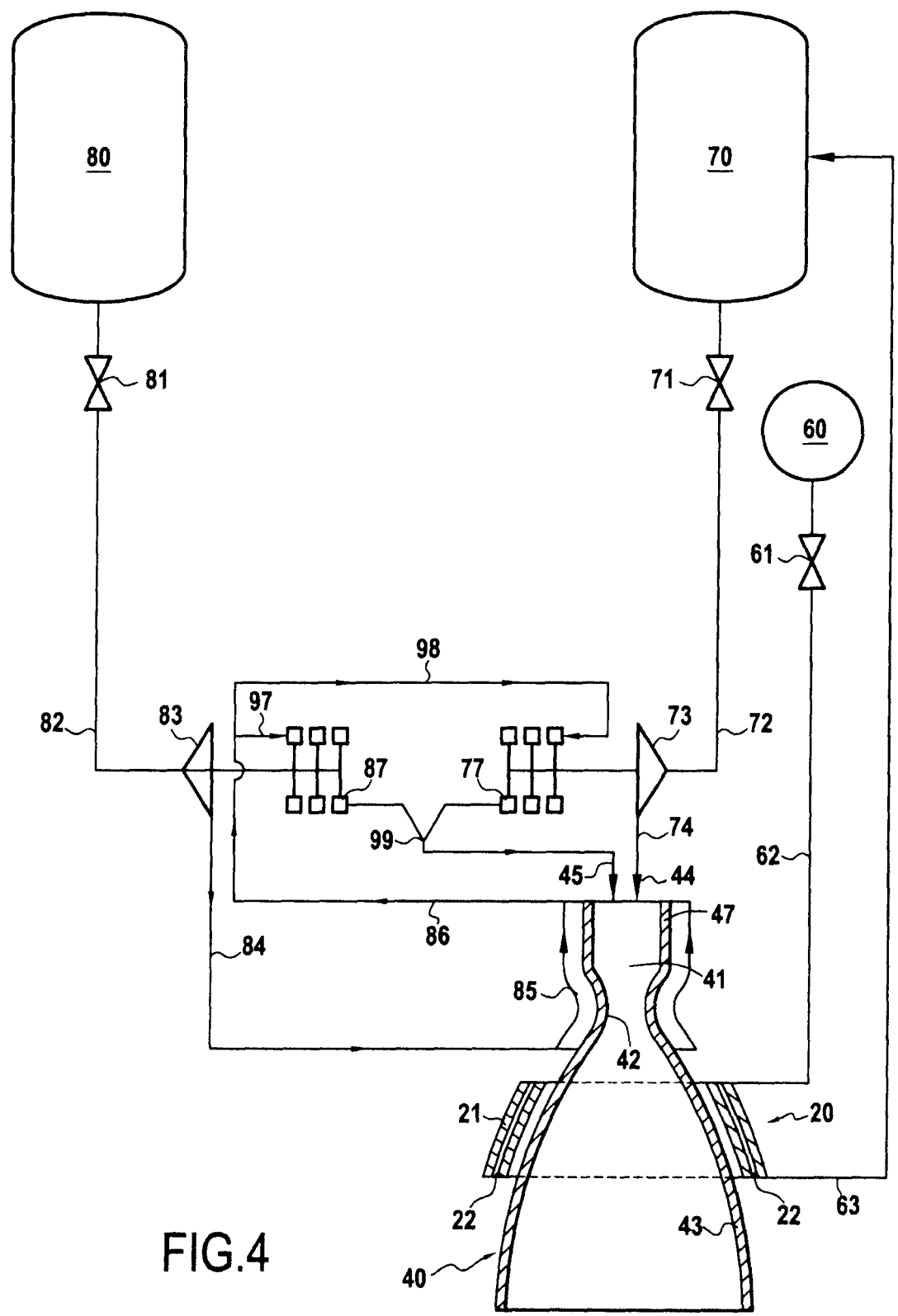
FIG. 4 is an overall diagrammatic view of an example of a rocket engine to which the invention is applicable.

The description begins briefly with reference to FIG. 4 relating to an example of an expander cycle rocket engine to which the invention is particularly applicable.

A stream of fuel, such as hydrogen, stored in a tank 80 is pumped from the tank via a pipe 82 and a valve 81 by means of a pump 83 and it passes along a pipe 84 to the wall 47 of the nozzle 40 where it flows along the nozzle in a network of tubes constituting a regenerator circuit 85 that lowers the temperature of the walls 47 of the top portion of the divergent section 43, of the nozzle throat 42, and of the combustion chamber 41 by heating the fuel propellant that is extracted from the regenerator circuit 85 via a pipe 86. Turbines 87 and 77, forming portions of turbopumps for pumping the fuel propellant by means of the pump 83 and for pumping the oxidizer propellant by means of the pump 73, receive propellant from the pipes 86, 97, and 98, which propellant has been gasified by the regenerator circuit 85 and has been exhausted at the outlet from the turbines 87 and 77 via a duct 99 leading to the combustion chamber 41. The entire flow of fuel propellant flowing in the pipe 86 is injected by the injector 45 into the combustion chamber 41. The oxidizer propellant taken from the propellant tank 70 is pumped via a pipe 72 and a valve 71 using a pump 73, and it passes via the pipe 74 to an injector 44 in order to be injected into the combustion chamber 41.

In conventional manner, the regenerator circuit 85 may be constituted by a network of metal tubes fitted onto a shell constituting the wall of the combustion chamber and all or part of the rocket engine nozzle.

The invention is not limited to nozzles that incorporate the regenerator circuit 85, which is given merely by way of example.

The invention applies to any type of divergent section 43, and may be applied, for example, to a rocket engine having a sheet of juxtaposed cooling tubes that are welded or brazed together, and that directly constitute at least a portion of the divergent nozzle. Nevertheless, the invention is preferably applied to divergent nozzles made of thermostructural composite material, e.g. of the carbon-carbon type, carbon-ceramic type, or ceramic-ceramic type, which nozzles may optionally be expandable.

The invention may also apply to a rocket engine operating with some other type of cooling circuit, e.g. an auxiliary hydraulic circuit distinct from the main propellant streams being fed to the engine.

With a divergent section 43 that is not cooled and that is made of composite material, when the rocket engine is in operation, it emits high levels of thermal radiation outwards. The power emitted by the divergent section 43 is generally greater than 250 kW/m² of the divergent section.

In accordance with the invention, a heater device 20 including at least one duct conveying an inert fluid is arranged outside the nozzle 40 in the immediate proximity thereof, but without making contact, in order to recover the energy of the thermal radiation that is emitted when the rocket engine is in operation and thereby heat the inert fluid, which may for example be helium.

In FIG. 4, there can be seen a tank of helium 60 that is connected by a pipe 62 and a valve 61 to the heater device 20, and a pipe 63 that connects the heater device to the liquid oxygen tank 70 in order to provide the tank 70 with helium for pressurizing it.

In FIG. 4, there can be seen a heater device 20 with a plate in the form of a frustoconical sector having channels 22, but various embodiments are possible for this radiant heat exchanger that serves to recover the radiant energy from the rocket engine and also to pressurize one or more propellant tanks while obtaining an improvement of several tens of kilograms in terms of payload in comparison with conventional helium pressurization systems that do not use a radiant heat exchanger.

The heater recovering the radiant energy coming from a rocket engine is made up of a metal structure in which the fluid for heating flows. The heater is dimensioned as a function of the available radiant power that it is capable of absorbing in its location. For constant geometry, its absorption power depends both on its absorption properties and on an overall visibility factor between the heater and the rocket engine. That is why a fine layer that is strongly absorbent from a thermal radiation point of view is deposited on the facing walls of the source of radiant power. The strong absorption of the deposit makes it possible to avoid reflecting too much of the incident flux coming from the rocket engine so as to avoid creating any points of overheating. The fluid flowing in the heat exchanger heats by conventional convection, thereby also serving to stabilize the temperature of the walls of the heater.

The environment of the heater is made up of:
the vacuum of space (at a temperature of 3 K); and
the rocket engine, itself comprising at least one part of axisymmetrical shape that is hot in operation (T>1000 K).

Figure 1:
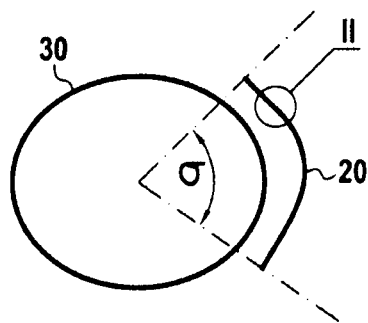
FIG. 1 is a diagrammatic cross-section view of a rocket engine nozzle and of a plate heater device in an embodiment of the invention.
Figure 3:
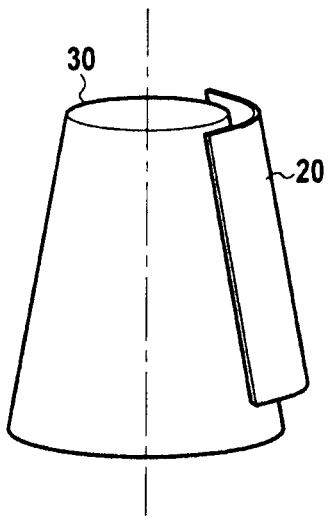
FIG. 3 is a diagrammatic perspective view of the nozzle and of the FIG. 1 plate heater device.

In one advantageous embodiment, the heater device 20 comprises a metal plate in the form of a frustoconical sector that extends around the divergent nozzle (represented diagrammatically by a truncated cone 30 in FIGS. 1 and 3) over an angle σ lying in the range 30° to 360°.

Figure 2:
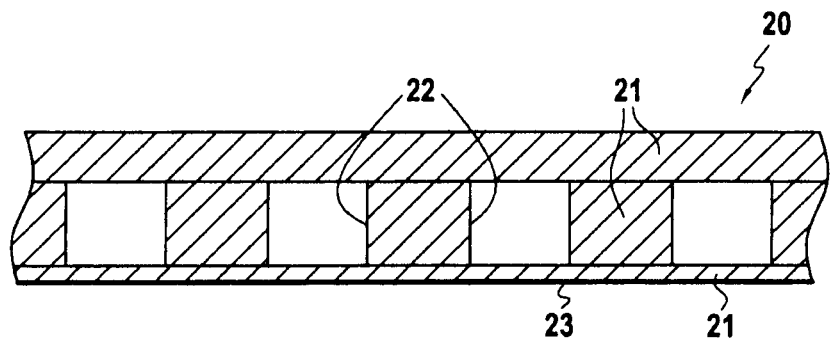
FIG. 2 is an enlarged view of a portion II of the FIG. 1 plate heater device.

As can be seen in FIG. 2, the plate 21 of the heater 20 includes a network of continuous channels 22 of rectangular or circular section. A fine layer 23 of strongly absorbent material from the thermal radiation point of view is formed on the wall of the plate 21 that faces the radiant power source 30.

The plate 21 of the heater 20 may present thickness lying in the range approximately 5 millimeters (mm) to 15 mm.

The invention claimed is:

1. A cryogenic-propellant rocket engine comprising:
at least a first tank for a first liquid propellant;
a second tank for a second liquid propellant;
a third tank for an inert fluid that is used to pressurize at least one of the first and second tanks;
an axisymmetrical nozzle including a combustion chamber, a device for injecting first and second liquid propellants into the combustion chamber, a nozzle throat, and a divergent section;
a heater device including at least one duct for conveying the inert fluid and arranged outside the nozzle in an immediate proximity of the nozzle, but without making contact with the nozzle, to recover energy of thermal radiation emitted when the rocket engine is in operation and to heat the inert fluid,
the heater device comprising a plate in a form of a portion of a conical frustum that extends exclusively around the divergent section of the nozzle over an angle σ lying in a range 30° to less than 360°.

2. A rocket engine according to claim 1, wherein the heater device comprises a metal structure in which the inert fluid for heating flows and a fine layer that is strongly absorbent from a thermal radiation point of view deposited at least on walls that face the nozzle constituting a radiant power source.

3. A rocket engine according to claim 1, wherein the plate of the heater device presents a thickness lying in a range 5 mm to 15 mm.

4. A rocket engine according to claim 1, wherein the plate of the heater device includes a network of continuous channels of rectangular or circular section.

5. A rocket engine according to claim 1, wherein the inert fluid is helium.

6. A rocket engine according to claim 1, wherein said first tank for a first liquid propellant includes at least one tank of liquid oxygen.

7. A rocket engine according to claim 6, further comprising pipes making a connection between the heater device and the liquid oxygen tank to supply it with said inert fluid comprising pressurizing helium.

8. A rocket engine according to claim 1, further comprising pipes making a connection between the heater device and the first tank comprising a liquid oxygen tank to supply it with said inert fluid comprising pressurizing helium.

9. A rocket engine according to claim 1, wherein the divergent section of the nozzle is made of thermostructural carbon-carbon, carbon-ceramic, or ceramic-ceramic composite material.

10. A rocket engine according to claim 1, wherein the conical frustum extends exclusively around the divergent section of the nozzle such that the plate does not overlap the combustion chamber, the device for injecting first and second liquid propellants, or the nozzle throat in a radial direction of the nozzle.

11. A rocket engine according to claim 1, wherein the device for injecting first and second liquid propellants is an injector.

* * * * *